(12) United States Patent
Acklin et al.

(10) Patent No.: US 6,350,135 B1
(45) Date of Patent: Feb. 26, 2002

(54) POWER OUTLET FOR DIVIDED CHANNEL RACEWAY

(75) Inventors: Mark A. Acklin, Mokena; Mark A. Vogel, Hinsdale, both of IL (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 09/620,690

(22) Filed: Jul. 20, 2000

Related U.S. Application Data

(60) Provisional application No. 60/146,196, filed on Jul. 29, 1999.

(51) Int. Cl.$^7$ .................................................. H01R 4/60
(52) U.S. Cl. .......................................... 439/211; 174/48
(58) Field of Search ................................. 439/211, 207, 439/214, 209, 212, 213; 174/101, 48; 52/220.5

(56) References Cited

U.S. PATENT DOCUMENTS

| | | |
|---|---|---|
| 3,821,688 A | 6/1974 | Larsile |
| 4,857,670 A | 8/1989 | Frank et al. |
| 4,888,452 A | 12/1989 | Krehl et al. |
| 4,952,163 A | 8/1990 | Dola et al. |
| 5,141,447 A | 8/1992 | Poirier |
| 5,149,274 A | 9/1992 | LeMaster |
| 5,162,614 A | 11/1992 | Bogiel et al. |
| 5,336,849 A | 8/1994 | Whitney |
| 5,340,327 A | 8/1994 | LeMaster |
| 5,739,470 A | 4/1998 | Takeda |
| 5,784,841 A | 7/1998 | Nowell |

FOREIGN PATENT DOCUMENTS

| | | |
|---|---|---|
| EP | 0 389 382 A1 | 3/1990 |
| GB | 1433401 | 4/1973 |

*Primary Examiner*—Brian Sircus
*Assistant Examiner*—Javaid Nasri
(74) *Attorney, Agent, or Firm*—Blank Rome Comisky & McCauley LLP

(57) ABSTRACT

A power outlet for a divided channel raceway system and method for installation are provided wherein the power outlet includes a base mountable substantially over the communication channel of the raceway and a terminal interface arm for extending from the base into the power channel of the raceway.

8 Claims, 7 Drawing Sheets

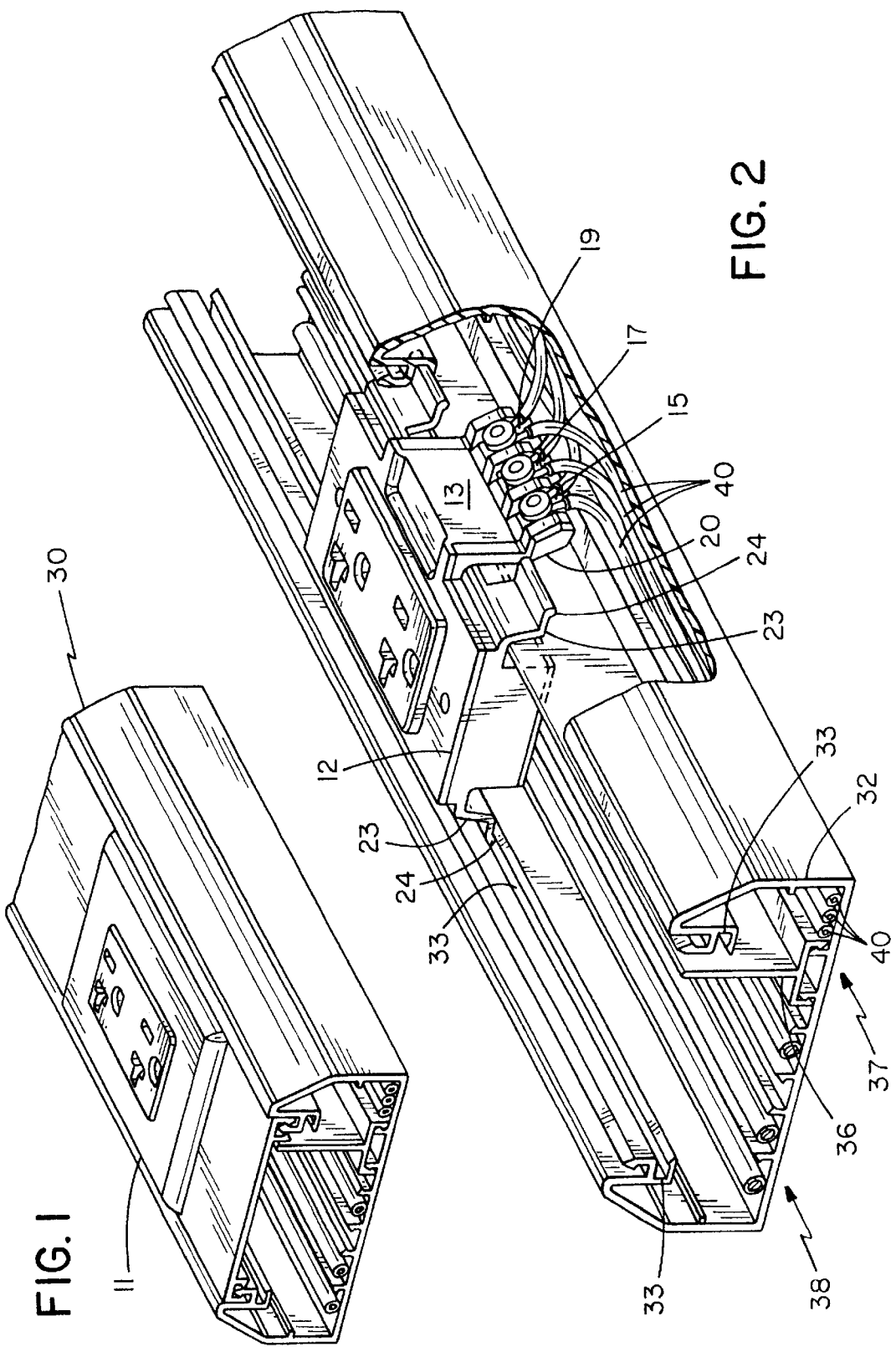

POWER OUTLET FOR DIVIDED CHANNEL RACEWAY

Applicants claim, under 35 U.S.C. §119(e), the benefit of priority of the filing date of Jul. 29, 1999, of U.S. Provisional Patent Application Serial No. 60/146,196, filed on the aforementioned date, the entire contents of which are incorporated herein by reference.

TECHNICAL FIELD

The present invention relates to an outlet for attachment to a divided channel raceway, and more particularly to a power outlet which can be mounted on the communication side of a divided raceway and including a terminal interface arm for connection with the wires on the power channel of the raceway.

BACKGROUND OF THE INVENTION

Divided channel wiring raceway systems have become common practice for utilizations requiring the installation of power and communication conductors within the same wiring duct. These raceway systems are frequently utilized in commercial or industrial settings where design, layout, production, and equipment requirements are constantly changed or upgraded. Flexibility and adaptability in these constantly evolving environments makes the surface mount raceway system the preferred method over conductors installed within the walls of a building. However, the wiring plans generally require both power outlets and communication outlets and frequently more than one of each on the raceway system. A disadvantage found in systems of this type is that for termination purposes the standard communication and power outlets are terminated in a manner such that they need to be mounted over the communication or power channels respectively of the divided system. In particular, a standard power outlet is terminated with wires extending rearwardly from both sides of the receptacle. Thus, in view of the UL isolation requirements it has been necessary to mount the power outlet over the power side of the raceway. And while there is need for a significant amount of channel space for the cables in the communication side, there is relatively little room required for the power cables.

Another alternative for placement of the standard power outlet in a divided channel raceway system is to not have the separate power side large enough to contain the power outlet, but to precisely cut the divider wall where the outlet will be and provide an additional insulative box mounted to the raceway. The insulative box would be positioned beneath the outlet in order to provide the required separation between communication cables and power wires. This results in problems related to the destruction of the divider wall as well as the precision needed to cut the divider wall for proper placement of the outlet. Also, the extra depth taken up in the channel by the additional insulative box reduces the area for the communication cables.

Thus requiring the power outlet to be mounted over the power channel such that the power wires can be connected to a standard outlet leads to a much larger power channel than is necessary and subsequently a much larger raceway system than is desired. Similarly requiring the precise cutting of the divider wall in conjunction with the use of an extra insulative box for terminating a standard outlet over the communication channel has drawbacks. Therefore, improved power outlets for use with divided raceway systems are desired.

SUMMARY OF THE INVENTION

To address the above-described issues, a new and useful divided channel raceway system is provided wherein the system includes a divided channel raceway having a divider wall for partitioning the channel raceway into a power channel and a communication channel and a power outlet including a base mounted substantially over the communication channel and a terminal interface arm extending from the base into the power channel to facilitate connectivity with power wires therein.

Also disclosed is a power outlet for a divided channel raceway system including a divided channel raceway having a divider wall for partitioning the channel raceway into a power channel and a communication channel. The power outlet includes a base mountable substantially over the communication channel and a terminal interface arm extending from the base into the power channel to facilitate connectivity with power wires therein.

Also disclosed is a method for installing a power outlet in a divided channel raceway system including a divided channel raceway having a divider wall for partitioning the channel raceway into a power channel having a plurality of power wires therein and a communication channel having at least one communication wire therein. The power outlet includes a base and a terminal interface arm extending from the base. The method includes the steps of positioning the power outlet such that the terminal interface arm can be inserted into the power channel, inserting the terminal interface arm into the power channel, and rotating the power outlet to retain the terminal interface arm in the power channel and to mount the bases substantially over the communication channel.

BRIEF DESCRIPTION OF THE DRAWINGS

FIG. 1 is a perspective view of the power outlet assembled and as used with a divided channel raceway system;

FIG. 2 is a partially broken away perspective view of the power outlet of FIG. 1 as used with a raceway system, showing the power wires terminated to the outlet;

DESCRIPTION OF THE PREFERRED EMBODIMENTS

Figure 3:
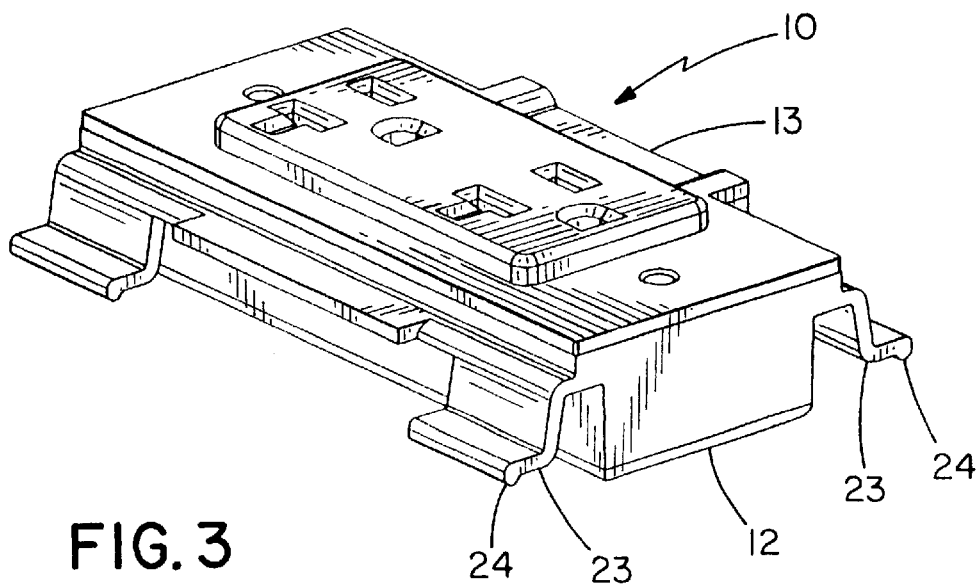
FIG. 3 is a top perspective view of the power outlet of FIG. 1.
Figure 4:
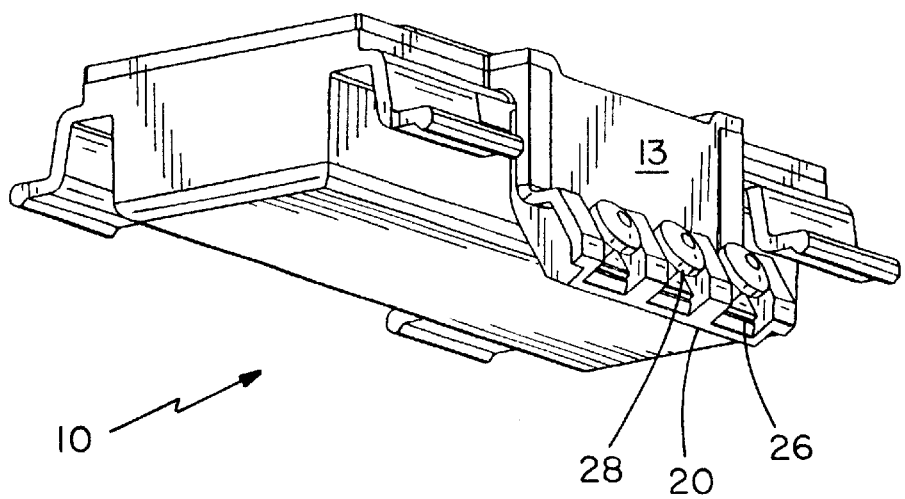
FIG. 4 is a bottom perspective view of the power outlet of FIG. 1.
Figure 5:
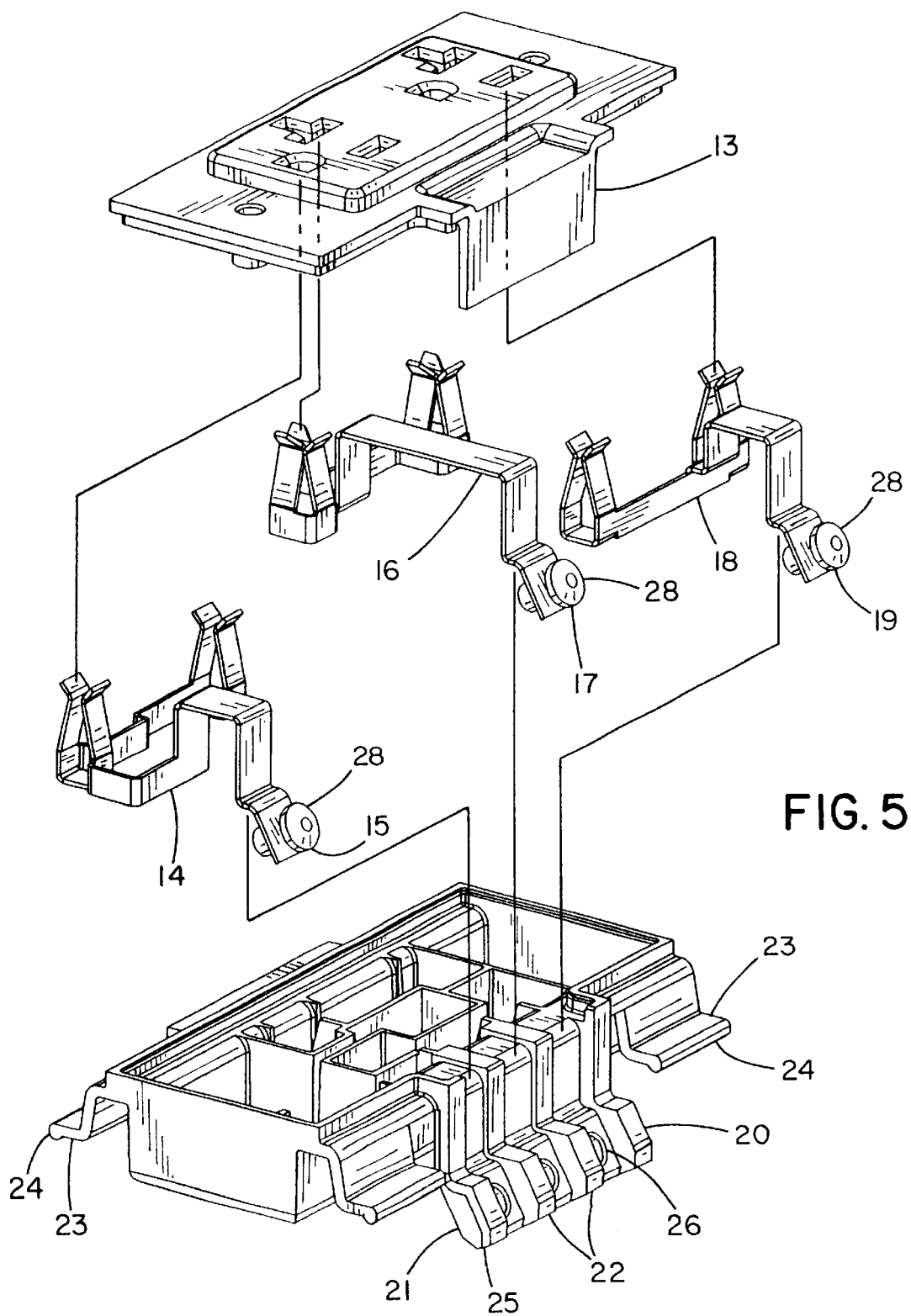
FIG. 5 is a top exploded view of the power outlet of FIG. 1.
Figure 6:
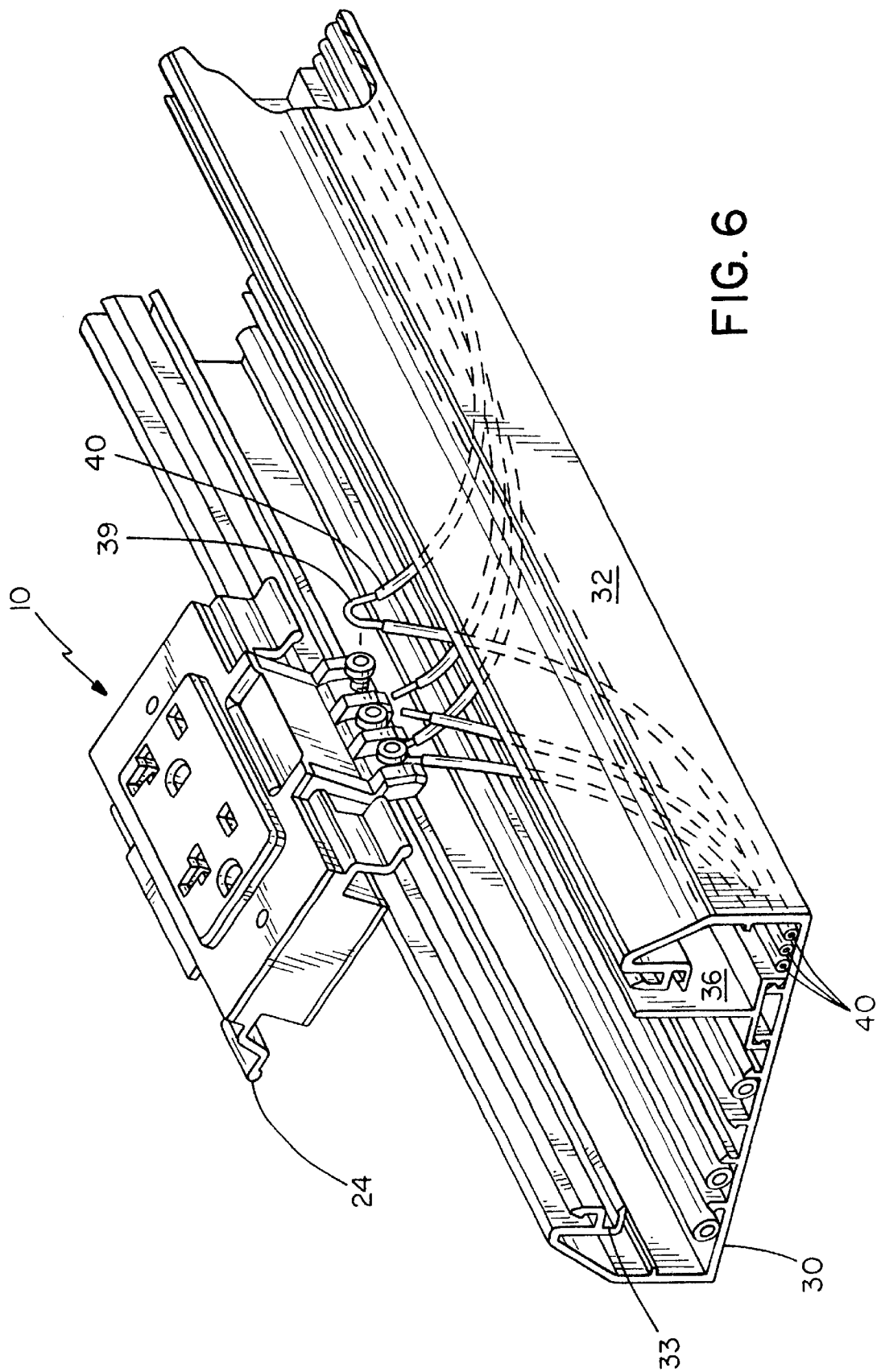
FIG. 6 is a perspective view of the power outlet being terminated to the power wires of the raceway system.
Figure 7:
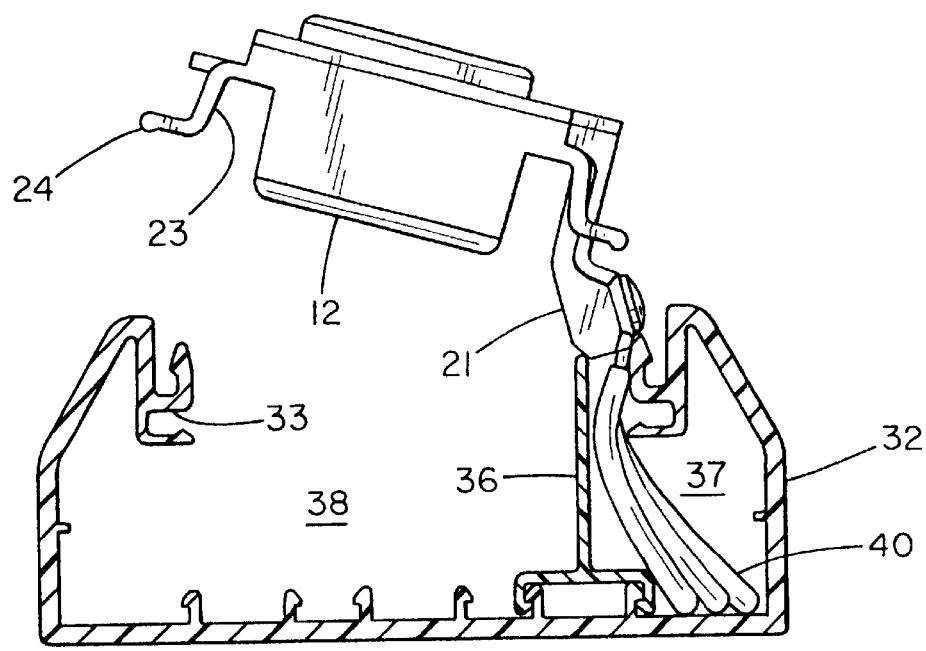
FIG. 7 is a cross-sectional view showing a terminated power outlet at the initial stage of assembly to the raceway system.
Figure 8:
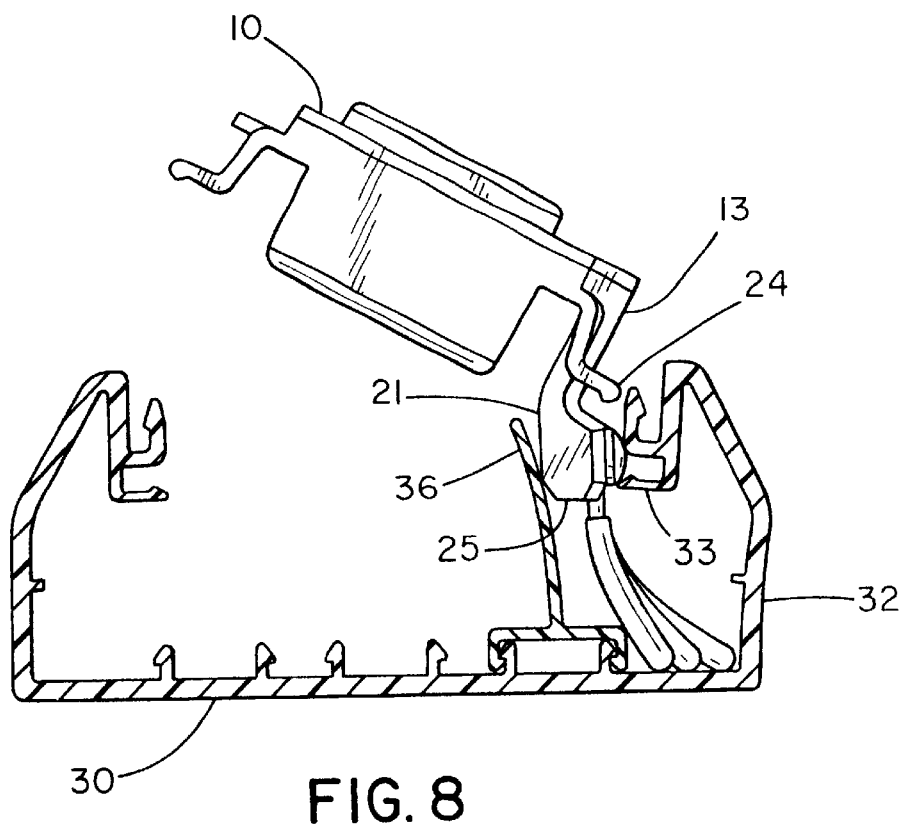
FIG. 8 is a side cross-sectional view of the power outlet at a further stage of assembly to the raceway system.
Figure 9:
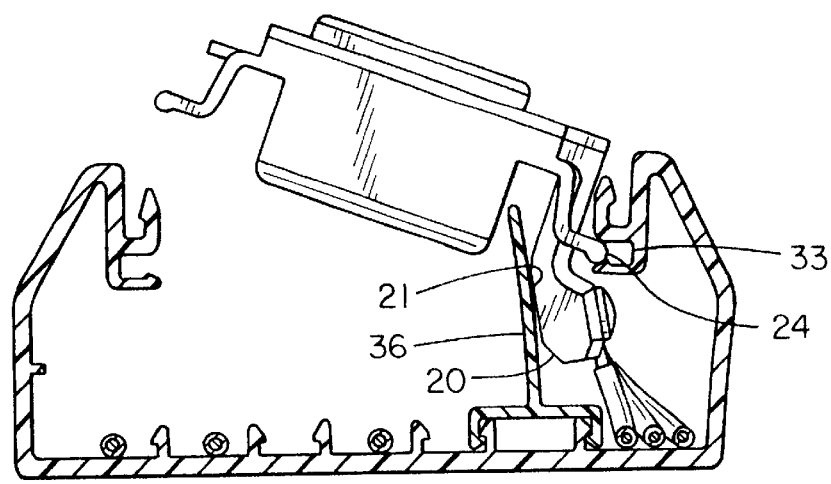
FIG. 9 is a side cross-sectional view of the power outlet at a further stage of assembly to the raceway system.
Figure 10:
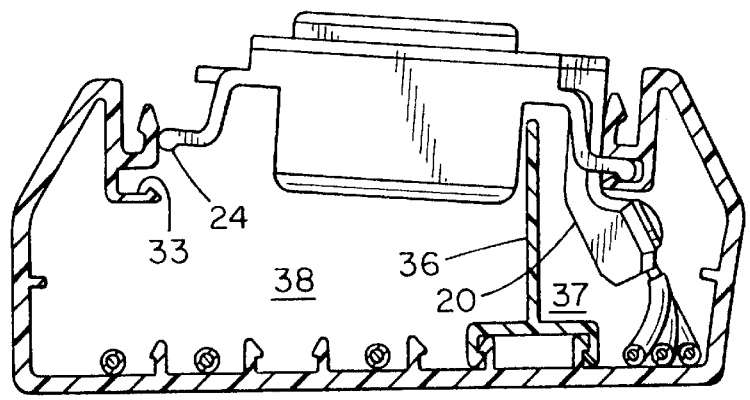
FIG. 10 is a cross-sectional view of the power outlet at a near final assembly stage to the raceway system.
Figure 11:
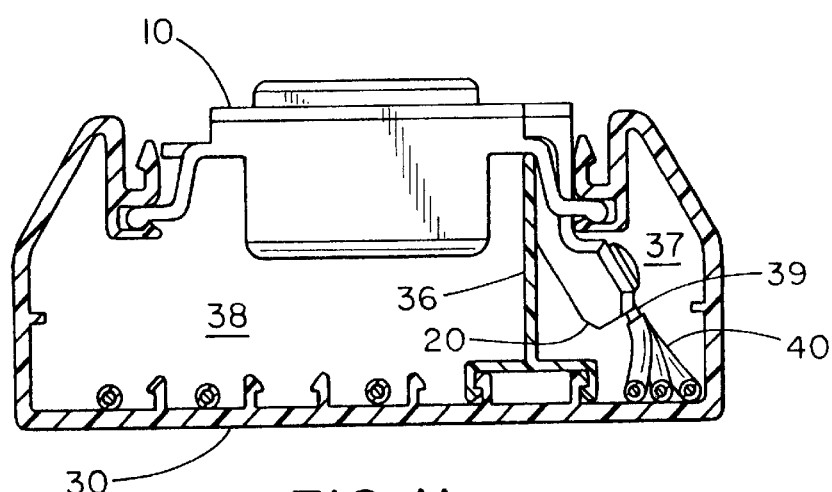
FIG. 11 is a cross-sectional view of the power outlet finally assembled to the raceway system.
Figure 12:
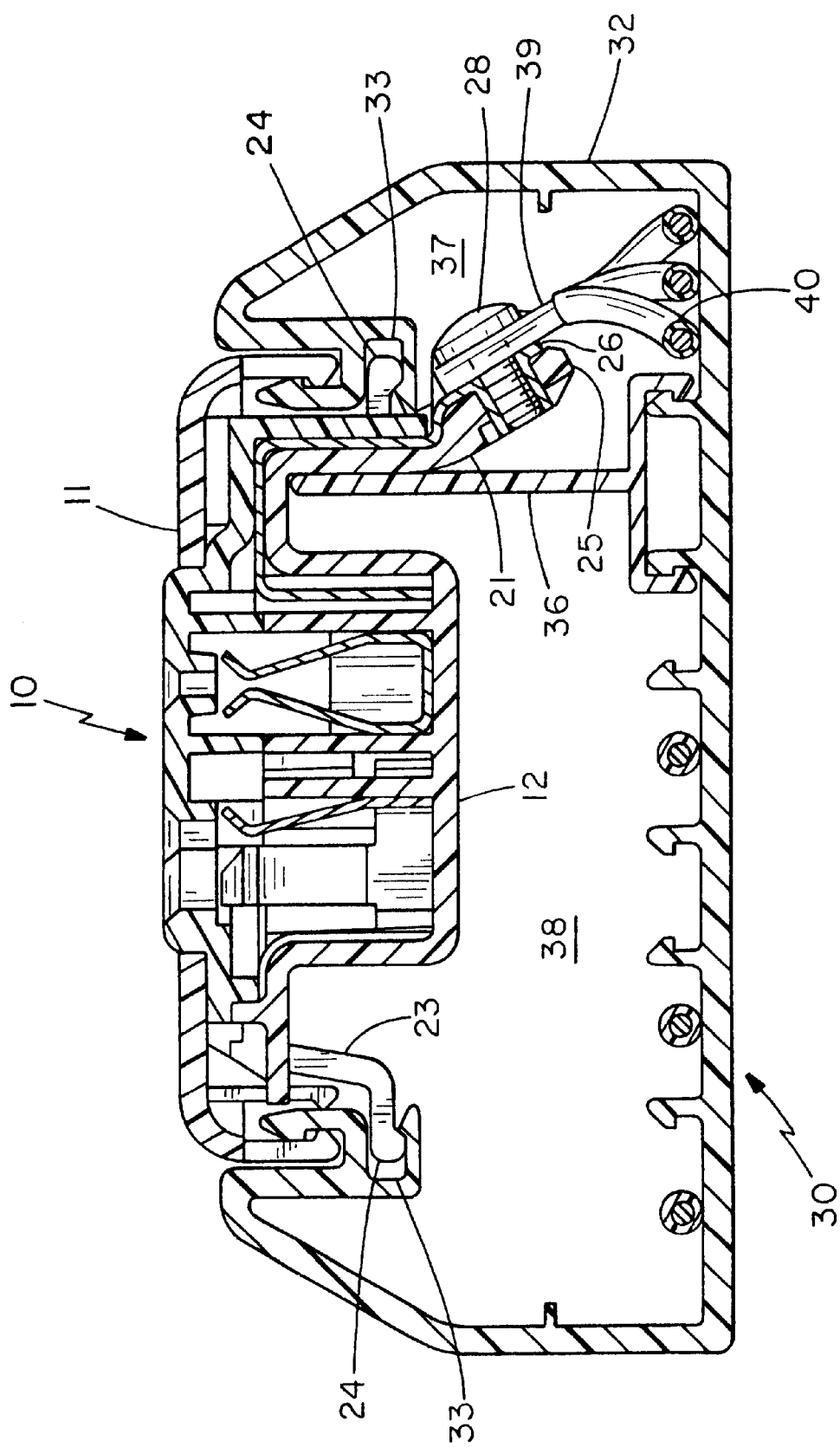
FIG. 12 is a side cross-sectional view of the connected power outlet mounted on the raceway system.

This application claims the benefit of U.S. Provisional Application No. 60/146,196, filed Jul. 29, 1999. A representative use of a power outlet in accordance with the present invention as applied to a divided power and communication raceway system generally be seen in FIG. 1. As can best be seen in FIGS. 2–4, the modular power outlet 10 is generally comprised of an outlet cover 11, and a base 12 including retention arms 23 on both sides having retention tabs 24 that engage with retention slots 33 inwardly disposed from the sidewalls 32 of the raceway 30. The base 12 supports the neutral 14, ground 16 and hot 18 contacts. Each of the contacts includes an extension which extends downwardly over a sidewall 13 of the base 12. The sidewall 13 includes a terminal interface arm 20 which supports and guides the plurality of contacts 14, 16, and 18 for termination with the power wires 40. Each contact includes pressure or screw 28 terminations 15, 17, and 19, respectively, between the contacts 14, 16, and 18 and the threaded contact plates 26, as best illustrated in FIG. 5. The terminal interface arm 20 includes separation walls 22 around each contact 14, 16, and 18 in order to meet the UL isolation requirements. The distal end 25 of the terminal interface arm is angled away from the vertical sidewall for assembly purposes which will be further explained below. The termination and assembly of the power outlet to the raceway system is illustrated in FIGS. 6–11. Initially, the power wires 40 are stripped at the termination area 39 and are positioned between the respective threaded contact plates 26 and the contact screw 28. The contact screw is then tightened to apply the required contact force. During installation of the power outlet 10 into the raceway 30, the outlet is positioned such that the distal end 25 of the termination interface arm 20 can be initially inserted into the space between the divider wall 36 and the sidewall 32. Preferably, the distal end of the interface arm is angularly disposed such that a backside guide edge 21 of the distal end 25 is substantially parallel to the sidewall 32 during initial insertion (see FIG. 8). Thus, upon insertion of the interface arm 20 a sufficient distance whereby the retention tab 24 is aligned with the retention slot 33, the deflection of the divider wall 36 creates a reaction force against the terminal interface arm 20 which helps direct the retention tabs 24 into the retention slots 33. The terminal interface arm 20 is preferably sized such that this divider wall 36 reaction force occurs once the contact screw 28 head passes by the lower wall of the retention slot 33.

This system allows for the power outlet 10 to be mounted over the communication channel 38 with the arm 20 depending into the power channel 37 for connectivity. Therefore, since the power channel no longer needs to separately accommodate a power outlet, the raceway dimensions can be significantly reduced without the additional detriments involved with needing to cut the divider wall. This design also improves the protectability of the outlet by having the terminals disposed below the latch on the walls of the raceway after installation. Finally, this outlet design also provides a one-piece outlet which meets UL requirements.

It should be noted that the above-described and illustrated embodiments of the invention are not an exhaustive listing of the forms that a power outlet for a divided channel raceway or the method of installing such an outlet could take in accordance with the invention; rather they serve as exemplary and illustrative of preferred embodiments of the invention as presently understood. Many other forms of the a invention are believed to exist. The invention is defined by the following claims.

What is claimed is:
1. A divided channel raceway system comprising:
   a divided channel raceway including a divider wall for partitioning said channel raceway into a power channel and a communication channel; and
   a power outlet including a base mounted substantially over said communication channel and a terminal interface arm extending from said base into said power channel to facilitate connectivity with power wires therein, said terminal interface arm supporting a plurality of power contacts thereon for connecting with said power wires.

2. The divided channel raceway system of claim 1 wherein said terminal interface arm includes separation walls between respective ones of said power contacts for enhancing the electrical isolation thereof.

3. A power outlet for a divided channel raceway system including a divided channel raceway having a divider wall for partitioning said channel raceway into a power channel and a communication channel, said power outlet comprising:
   a base mountable substantially over said communication channel; and
   a terminal interface arm extending from said base into said power channel to facilitate connectivity with power wires therein, said terminal interface arm supporting a plurality of power contacts thereon for connecting with said power wires.

4. The power outlet of claim 3 wherein said terminal interface arm includes separation walls between respective ones of said power contacts for enhancing the electrical isolation thereof.

5. A method for installing a power outlet in a divided channel raceway system including a divided channel raceway having a divider wall for partitioning said channel raceway into a power channel having a plurality of power wires therein and a communication channel having at least one communication wire therein, said power outlet including a base and a terminal interface arm for extending from said base, said terminal interface arm supporting a plurality of power contacts thereon for connecting with said power wires, said method comprising the steps of:
   positioning said power outlet such that said terminal interface arm can be inserted into said power channel;
   inserting said terminal interface arm into said power channel; and
   rotating said power outlet to retain said terminal interface arm in said power channel and to mount said base substantially over said communication channel.

6. The method of claim 5 wherein said power channel includes a sidewall and said terminal interface arm includes a distal end having a backside guide edge such that during said positioning step said distal end of said terminal interface arm is angularly disposed, and said backside guide edge of said distal end is substantially parallel to said sidewall during said insertion step.

7. The method of claim 6 wherein said divider wall is resilient, said power channel sidewall includes a retention slot, said base portion includes a retention tab, and said inserting step causes said terminal interface arm to resiliently deflect said divider wall, causing a resilient counter-deflection force of said divider wall to direct said retention tab into engagement with said retention slot.

8. The method of claim 7 wherein said power contacts each include a contact plate and a contact screw and said method includes the step of stripping a portion of one of said power wires before said connecting step and said connection step includes the steps of positioning said stripped power wire between said contact plate and said contact screw and tightening said contact screw to ensure sufficient contact between said power contact and said power wire.

* * * * *

UNITED STATES PATENT AND TRADEMARK OFFICE
CERTIFICATE OF CORRECTION

PATENT NO. : 6,350,135 B1
DATED : February 26, 2002
INVENTOR(S) : Mark A. Acklin et al.

It is certified that error appears in the above-identified patent and that said Letters Patent is hereby corrected as shown below:

<u>Title page,</u>
Item [73], Assignee "University of Rochester, Rochester, NY (US)" should be
-- Panduit Corp., Tinley Park, IL (US) --; and
Item [74], *Attorney, Agent or Firm*: "Blank Rome Comisky & McCauley LLP" should be -- Robert A. McCann, Jay A. Saltzman --.

Signed and Sealed this

Tenth Day of September, 2002

*Attest:*

*Attesting Officer*

JAMES E. ROGAN
*Director of the United States Patent and Trademark Office*